United States Patent Office 2,810,701
Patented Oct. 22, 1957

2,810,701

AQUEOUS EMULSION-SUSPENSION TEXTILE TREATING COMPOSITIONS AND PROCESSES OF TREATING TEXTILES WITH SAME

Wilson A. Reeves and John D. Guthrie, New Orleans, La., assignors to the United States of America as represented by the Secretary of Agriculture No Drawing. Application November 9, 1954,
Serial No. 467,902

9 Claims. (Cl. 260—29.4)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to improving the properties of cellulosic textile materials by impregnating them with resin. More particularly, the invention provides cellulosic textile materials containing a resinous impregnant which imparts flame resistance in addition to other desirable textile properties or which imparts an unusually great flame resistance for the amount resinous impregnant.

Prior work has resulted in the development of a variety of polymers capable of being produced by condensation and/or esterification reactions involving tetrakis(hydroxymethyl)phosphonium chloride, which has the formula $(HOCH_2)_4PCl$, and is abbreviated THPC, and/or tris(hydroxymethyl)phosphine oxide, which has the formula $(HOCH_2)_3PO$, and is abbreviated THPO. The methylolphosphorus, $PCH_2OH$ groups, of each of these compounds are capable of either: (1) condensing with a compound which is capable of condensing with formaldehyde, or (2) being esterified by an esterifying agent which is capable of esterifying methanol. Compounds of the group, THPC, THPO, and derivatives of either of them which contain a plurality of methylol-phosphorus groups of the present compounds, are hereinafter referred to by the term "phosphorus compounds."

The polymers capable of being produced by condensation and/or esterification reactions of the phosphorus compounds can be produced in the form of cross-linked polymers or thermosetting resins. Hereinafter, these polymers are referred to by the term "methylol-phosphorus" polymers or resins. The compounds capable of either condensing with formaldehyde or esterifying methanol are hereinafter referred to by the term "methylol-reactive compounds."

The methylol-phosphorus polymers are characterized by recurring structural units containing phosphorus atoms in radicals of the group $(—CH_2)_4PCl$ and $(—CH_2)_3PO$. Methylol-phosphorus alkyds are produced by reacting at least one of the phosphorus compounds with at least one polycarboxylic acid esterifying agent. Phenolic methylol-phosphorus polymers are produced by reacting at least one of the phosphorus compounds with at least one phenolic compound.

Certain nitrogen containing methylol-phosphorus polymers, which are hereinafter referred to as "nitrilo" methylol-phosphorus polymers or resins, are particularly useful as textile flammability retardants. These resins are adapted to being partly or completely formed within the textile by impregnating the textile with an aqueous solution or dispersion of their resin forming reactants, and causing the reactants to react in situ until an insolubilized resin is produced. The nitrilo-methylol-phosphorus polymers are capable of being produced by condensing at least one of the phosphorus compounds, with the elimination of water, with at least one organic nitrogen compound having a molecular weight of not more than about 400 and containing at least one trivalent nitrogen atom and at least two members of the group H and $CH_2OH$ attached to trivalent nitrogen atoms. This class of organic nitrogen compounds is hereinafter referred to by the term "nitrogen compounds." Methods of producing the nitrilo-methylol-phosphorus polymers and employing them to reduce the flammability of textiles are more completely described in copending patent applications, Serial No. 378,437 filed September 3, 1953; Serial No. 393,021, now Patent No. 2,772,188; and Serial No. 393,023 filed November 18, 1953, now Patent No. 2,795,569.

In a process of impregnating a textile material with a thermosetting resin, the resin is usually prepared in a further polymerizable form and incorporated into a textile treating agent comprising a liquid solution or emulsion. The use of aqueous solutions or emulsions is particularly advantageous because of the reduced fire hazard. The textile materials are impregnated with such textile treating agents, dried, and then subjected to conditions which insolubilize the polymers in situ.

Such a treatment produces textile materials the fibers of which are either coated with or contain the insolubilized thermosetting resin. When the fibers of textile materials are so treated with nitrilo-methylol-phosphorus polymers, the textiles are rendered materially less flammable; and when the fibers are so treated with aminoplast polymer the materials are rendered materially more wrinkle resistant.

However, it has been found that while such an impregnation materially improves the properties of the heavier fabrics, it is often difficult to obtain the desired degree of flame resistance in the lighter weight fabrics without adversely altering other properties of the fabrics. For example, it is often difficult to adequately flameproof fabrics of less than about 7 ounces per yard, or to impart to any fabric an appreciable increase in both wrinkle-resistance and flame resistance, without causing an undesirable increase in the stiffness of the fabric.

In addition, further polymerizable polymers contained in liquid textile treating agents tend to polymerize on standing, and in general, it is necessary to prepare the further polymerizable resin and incorporate it in the liquid textile treating agent just shortly before the textile treating agent is to be applied to a textile. This is somewhat disadvantageous to numerous textile treating concerns which are not equipped to carry out the chemical process involved in the production of the further polymerizable resin.

An object of the present invention is to provide an aqueous textile treating composition which will deposit a laundering and dry cleaning resistant resinous substance in a textile impregnated with the composition so as to impart an unusually high degree of flame-resistance to the textile without materially increasing its stiffness. Another object is to provide an aqueous textile treating composition by which both the wrinkle resistance and the flame resistance of a textile can be materially enhanced with a single treatment. A further object is to provide an aqueous textile treating composition which can be prepared by simply agitating a mixture of stable compounds without conducting any controlled partial polymerization reaction.

In general, in accordance with this invention, aqueous emulsion-suspension textile treating compositions are produced by agitating, to form an aqueous emulsion, a mixture of (a) water soluble, cotton fiber penetrating, resin forming reactants of at least one resin of the group, aminoplast and nitrilo-methylol-phosphorus resins, (b) a relatively inert water immiscible organic liquid, (c) an emulsifying agent; (d) enough water to form a stable oil-in-water emulsion. In this oil-in-water emulsion, an amount of powdered insolubilized phosphorus-containing thermosetting resin is dispersed, providing, in the resulting emulsion-suspension, from about 20 to 80 parts of insolubilized resin per 100 parts of resin forming reactants in which is present at least about 0.1 parts of phosphorus per part of nitrogen.

When textile materials containing cellulosic fibers are impregnated with such aqueous compositions, and the resin forming reactants are converted to resins in situ, the so-treated textile materials become impregnated with an insolubilized thermosetting resin in the form of a continuous resin phase which extends into the cellulosic fibers and which surrounds dispersed discreet solid particles of an insolubilized resin. These particles are present in proportions which, in conjunction with the continuous phase, impart a materially improved flame resistance to the textile.

Where a textile material containing cellulosic fibers is impregnated with an aqueous emulsion-suspension containing the resin forming reactants of an aminoplast resin so that the resin pick-up of the textile is from about 7 to 35% of total resinous materials, where the proportions of the resinous materials are such that from about 4 to 20% of the resinous material pick-up consists of the aminoplast resin forming reactants, and where the resin forming reactants are converted to a resin in situ, both the wrinkle resistance and the flame resistance of the so-treated textile material are materially enhanced. The wrinkle resistance and the stiffness of the so-treated textile is substantially the same as that of a textile to which only the aminoplast resin has been applied in the usual way; but the textile material treated with the aqueous emulsion-suspension composition exhibits a materially greater flame resistance.

When a textile material containing cellulosic fibers is impregnated with an aqueous emulsion-suspension containing nitrilo methylol-phosphorus resin forming reactants and the resin forming reactants are converted to a resin in situ, the so-treated textile material is materially less stiff than one to which the same amount of nitrilo-methylol-phosphorus resin is applied in the usual way and enough additional phosphorus containing resin is added in the usual way to impart the same degree of flame resistance.

Substantially any of the natural or synthetic organic textile materials in the form of fibers, yarns, threads, or fabrics can be treated in accordance with the present invention. Suitable materials include cotton, flax, ramie, wool, silk, regenerated cellulose such as the viscose rayons, mercerized cellulosic textile materials and the like. The process is particularly adapted to the treatment of threads or fabrics containing cotton and regenerated cellulose fibers.

The water soluble, cotton fiber penetrating resin forming reactant can be: (1) polymeric reactants such as, a further polymerizable aminoplast or nitrilo-methylol-phosphorus polymer which is both water soluble and capable of penetrating into a cotton fiber; or (2) monomeric reactants, such as a substantially unreacted mixture of at least one water soluble organic nitrogen compound with: (a) at least one aldehyde capable of yielding aminoplast resins, or (b) at least one water soluble phosphorus compound.

Illustrative examples of suitable water soluble, cotton fiber penetrating further polymerizable aminoplast polymers include the condensation polymers of amino, imine, amido, or imido compounds with aldehydes such as those described in Modern Plastics 17, 433, 1939, or "Chemistry of synthetic resins" [by C. Ellis, published by Reinhold Publishing Corp., chapter 26 (1935)], which are both water soluble and cotton fiber penetrating, i. e. which have a molecular weight low enough to allow them to penetrate into a cotton fiber.

In general, the further polymerizable aminoplast or nitrilo-methylol-phosphorus polymers having a molecular weight low enough to penetrate into a cotton fiber are completely water soluble polymers. Whether a given further polymerizable aminoplast or nitrilo-methylol-phosphorus polymer has a molecular weight low enough to penetrate into a cotton fiber can readily be ascertained by impregnating cotton fibers with the polymer and observing stained sections of the impregnated fibers under a microscope (by the method J. T. Marsh).

Suitable nitrilo-methylol-phosphorus polymers comprise condensation polymers of at least one phosphorus compound with at least one nitrogen compound, such as the polymers which are more fully described in copending applications, Serial Nos. 378,437 and 393,023, which are water soluble and cotton fiber penetrating.

Suitable mixtures of a water soluble nitrogen compound with a water soluble aldehyde include mixtures of at least one such nitrogen compound with at least one such aldehyde. Illustrative examples of such aldehydes include: formaldehyde, propiolaldehyde, butyraldehyde, and the like water soluble aldehydes. In general, any water soluble aldehyde capable of reacting to form an aminoplast can be used. However, the water soluble aliphatic aldehydes containing 1 or 2 carbon atoms are preferred.

Suitable mixtures of a water soluble nitrogen compound with a water soluble phosphorus compound include mixtures in which the phosphorus compound is THPC, THPO, or a water soluble reaction product of either of them with a methylol-reactive compound, (i. e. a compound capable of condensing with formaldehyde or esterifying methyl alcohol) which reaction product is water soluble and retains a plurality of the $PCH_2OH$ groups of the $PCH_2OH$ groups of the parent compound.

Illustrative examples of compounds capable of condensing with formaldehyde include: the nitrogen compounds, such as melamine, urea, dicyandiamide, ethylenimine, trimethylenepentamine, stearylamine and the like; and phenolic compounds such as phenol, resorcinol, and the like.

Illustrative examples of compounds capable of esterifying methyl alcohol include the mono and polycarboxylic acid esterifying agents such as acetic anhydride, butyryl chloride, stearic acid, phthalic acid, chlorendic acid, succinyl dichloride and the like.

The relatively inert water immiscible organic liquids which can be used comprise water immiscible liquids which are inert toward the textile materials, the thermosetting resins and their resin forming reactants. The water immiscible organic solvents which boil at from about 120 to 210° C. are particularly suitable. Illustrative examples of such organic solvents include aliphatic hydrocarbons such as octane, nonane, cycloparaffins such as 1,2-dimethylcyclohexane and n-propylcyclohexane, the hydrocarbon mixture available under the trade name of Varsol, and the like aliphatic hydrocarbons. The aliphatic hydrocarbons boiling at from about 177 to 204° C., such as the above-mentioned Varsol, are preferred.

Substantially any of the conventional emulsifying agents, or mixtures thereof, can be used in the present process. Illustrative examples of suitable emulsifying agents include the tertitary amine salts of long chain fatty acids such as triethanolamine stearates, oleates, and the like; the sulfated long chain alcohols; dioctyl sodium succinate, carboxymethyl cellulose, the polyvinyl alcohols, and the like.

The proportions of the oil and water phases of the oil-in-water emulsions can be varied widely as long as the resulting emulsion is stable for at least an hour. Both the proportion and number of emulsifying agents can be varied widely; but the use of less than about 5 parts of emulsifying agent per part of emulsion is preferred.

In preparing the emulsions, an organic liquid solution and an aqueous liquid solution are preferably prepared separately; then mixed together with vigorous agitation. A colloid mill is a particularly suitable agitating device. The emulsifying agent can be dissolved in either the organic or the aqueous solution, but is preferably dissolved in the organic solution, or formed in situ between the phases of the emulsion, e. g., by dissolving a long chain fatty acid in the organic solution and dissolving an amine in the aqueous solution so that they react to form an amine salt emulsifying agent when the solutions are mixed.

The use of amine salt emulsifying agent in which the amine is a water soluble tertiary amine such as triethanolamine, ethyl diethanolamine and the like, is preferred. The presence of such a water soluble tertiary amine in an aqueous solution containing a further polymerizable nitrilo-methylol-phosphorus polymer tends to inhibit the formation of water insoluble polymers prior to the heating of the further polymerizable polymer to a temperature materially above normal room temperature. In a preferred embodiment of the invention an amine salt emulsifying agent is formed in situ in the emulsion by dissolving the amine in the aqueous phase and dissolving a high molecular weight acid such as a long chain fatty acid, a rosin acid, or the like, in the organic phase.

The powdered insolubilized phosphorus-containing brittle resin can be any relatively unreactive brittle resin which is insoluble in aqueous or organic solvents and is ground to a powder. Such resins preferably contain at least about 5% phosphorus or 1% phosphorus if the resin contains at least 10% bromine.

Illustrative examples of phosphorus-containing resins which can be employed as the powdered insolubilized resin include: (1) nitrogen containing insolubilized methylol-phosphorus resins capable of being produced by reacting at least one phosphorus compound with at least one nitrogen compound containing at least two members of the group H and CH$_2$OH attached to trivalent nitrogen atoms until the reaction product is an insoluble brittle solid, such as the insolubilized nitrilo-methylol-phosphorus resins which are more completely described in copending applications, Serial Nos. 378,437, 393,021 and 393,023; the resins produced by an analogous reaction of a phosphorus compound with an inorganic derivative of ammonia containing a plurality of hydrogen atoms attached to trivalent nitrogen atoms such as ammonia, hydrazine, hydroxylamine, etc., or with an aromatic amino compound containing a plurality of members of the group H and CH$_2$OH attached to trivalent nitrogen atoms, such as aniline, the methylolated anilines, diphenylenediamine, etc. and the like nitrogen containing insolubilized phosphorus resins; (2) solid, insoluble phosphonitrilic ester adducts produced by substantially completely reacting at least one terminally unsaturated, polymerizable, alkenyl alcohol ester of a phosphonitrilic halide with at least one polyhalohydrocarbon containing at least two halogen atoms of the group bromine and chlorine attached to the same carbon atom, in the presence of a free radical reaction initiator, to produce a halomethylated alkenyl phosphonitrilic polyester-adduct containing phosphorus, nitrogen, and halogen, which phosphonitrilic ester adducts and processes for their production are more fully described in copending application Serial No. 467,900, filed of even date; (3) solid insoluble bromine containing methylol-phorphorus resins produced by substantially completely reacting at least one phosphorus compound with at least one bromine containing compound of the group polyfunctional nitrogen compounds and polyfunctional methylol-reacting compounds, which bromine containing nitrilo-methylol-phosphorus are more fully described in copending application Serial No. 467,898, filed of even date; (4) the phenolic methylol-phosphorus resins capable of being produced by reacting at least one phosphorus compound with at least one phenolic compound capable of condensing with formaldehyde, such as the bromohydroquinones, the methylolated phenols, the bromophenols, naphthols, etc., until an insolubilized resin is produced, examples of which include the insolubilized phenolic methylol-phosphorus resins which are more completely described in copending application Serial No. 348,137 filed April 10, 1953, now abandoned; (5) alkyl type methlyol-phosphorus resins capable of being produced by reacting at least one phosphorus compound with at least one polyfunctional acid esterifying agent until the reaction product is an insolubilized brittle solid, such as the insolubilized methylol-phosphorus alkyds produced by reacting a phorphorus compound with a polyfunctional carboxylic acid esterifying agent, such as chlorendic acid, which is more completely described in copending application Serial No. 393,020 filed November 18, 1953; (6) solid, insoluble polymeric addition products of polyhalohydrocarbons and polymerizable unsaturated neutral esters of phosphoric acid such as those more fully described in copending application Serial No. 403,943, filed January 13, 1954 now U. S. Patent 2,778,747, and U. S. Patents Nos. 2,686,768 and 2,686,769; (7) solid, insoluble brominated polymers of polymerizable unsaturated esters of phosphoric acid; and (8) solid, insoluble polymeric reaction products of phosphorus oxychloride and ammonia.

The insolubilized phosphors containing brittle resins can be powdered by comminuting them in any apparatus suitable for comminuting polymers. The polymers are preferably ground to a particle size at least small enough to pass through a standard screen of about 300 meshes per inch.

The amount of insolubilized powdered phosphorus containing resin which is suspended in the oil-in-water emulsion can be varied widely. The oil-in-water emulsions which are stable for at least an hour generally remain stable when up to about 0.2 parts of powdered insolubilized resin per part of emulsion is suspended in them. The suspension of as little as 50 parts of powdered insolubilized phosphorus containing resin per 100 parts of emulsion produces emulsion suspensions which impart an appreciable increase in flame resistance to textiles impregnated with the emulsion suspension.

Where it is desired to concurrently impart both flame resistance and wrinkle resistance to a cellulosic material, resin forming reactants of either the nitrilo-methylol-phosphorus or the aminoplast resins can be used; but the use of the aminoplast resin forming reactants is preferred. In accomplishing such a result it is preferable to employ less than about 20 parts of the resin forming reactants per 100 parts of an aqueous emulsion suspension containing not more than about 15 parts of powdered insolubilized thermosetting resin. Textiles are preferably impregnated with such emulsion suspension so that there is a resin add-on of the resin forming reactants of not more than about 20%.

The cellulosic textile materials can be impregnated by substantially any of the usual processes of impregnating textiles with aqueous emulsions using the usual apparatus and the usual wet pick-ups. In general, where a high resin "add-on" (percent increase in the weight of the dry textile material due to the resin incorporated in the textile material) is desired, it is preferable to employ a plurality of impregnating steps. The impregnated textiles are preferably mechanically freed of excess liquid and dried at from about 70 to 110° C. for a time sufficient to remove the bulk of the volatile materials.

After the textile materials have been impregnated with the emulsion suspensions the resin forming reactants are converted, in situ, to resins. The conversion, or insolubilization, can be accomplished by substantially any of the procedures usually used in the insolubilization of aminoplast or nitrilo-methylol-phosphorus polymers. Thermal insolubilization, by heating the impregnated textile materials to a temperature of from about 110 to 170° C. for from about 2 to 20 minutes with the longer time being used in conjunction with the lower temperature, is preferred. Insolubilization temperatures and times of from about 140 to 155° C. for from about 4 to 6 minutes are particularly suitable for 6 to 9 oz. twills or sateen.

The following examples further illustrate details of the invention.

EXAMPLE 1

*Emulsified monomeric nitrilo-methylol-phosphorus resin forming reactants with suspended powdered insolubilized nitrilo-methylol-phosphorus resin*

An aqueous emulsion was formed by agitating a mixture of (a) nitrilo-methylol-phosphorus resin forming reactants consisting of 9 parts of a water soluble methylolmelamine, 7 parts of urea and 15 parts of THPC, (b) an organic solvent consisting of 12 parts of Varsol, and an emulsifying agent consisting of 2 parts of stearic acid and 2 parts of an oil soluble long chain alcohol sulfonate, with about 30 parts of water until the mixture became an oil-in-water emulsion which was stable for at least an hour. In the formation of the emulsion, the resin forming reactants were dissolved along with 3 parts of triethanolamine in the water, and the solution so produced was mixed with a solution of the emulsifying agents in the organic solvent.

An insolubilized solid phosphorus containing thermosetting resin was prepared by dissolving 180 parts of THPC and 69 parts of a water soluble methylolmelamine in about 200 parts of water, heating the solution at about 110° C. for about one hour, spreading the resulting viscous liquid into a layer about 0.30 inch thick and heating it for about 1 hour at about 145° C. The resulting solid resin was ground in a ball mill into particles which would pass a standard 300 mesh screen. The powdered insolubilized resin was water washed until the washings were neutral.

About 10 parts of powdered insolubilized resin was suspended in the oil-in-water emulsion to produce an emulsion-dispersion containing 34 parts of resin forming reactants, about 11 parts of powdered insolubilized resin per 100 parts of emulsion suspension.

EXAMPLE 2

*Emulsified monomeric aminoplast resin forming reactants with suspended insolubilized nitrilo-methylol-phosphorus resin*

An aqueous emulsion was formed by agitating a mixture of (a) an aminoplast resin forming reactant consisting of 9 parts of a water soluble methylolmelamine, (b) an organic solvent consisting of 15 parts of Varsol, and (c) an emulsifying agent consisting of 2 parts of a long chain water soluble alcohol sulfonate and 2 parts of stearic acid with about 60 parts of water until the mixture became a stable oil-in-water emulsion. In the formation of the emulsion, the resin forming reactants, and the alcohol sulfonate were dissolved in water along with 2.4 parts of triethanolamine and the resulting solution was mixed with a solution of the stearic acid in the oil solvent.

About 17 parts of a powdered insolubilized resin prepared as described in Example 1 was suspended in the aqueous emulsion to produce an emulsion-dispersion containing about 8.4 parts of resin forming reactants and about 16 parts of powdered insolubilized resin per 100 parts of emulsion suspension. The resulting emulsion-suspension was stable for at least 2 hours.

EXAMPLE 3

*The effects of applying an emulsion-suspension compared with those of applying a continuous phase resin*

An aqueous emulsion-suspension was prepared by the procedure described in Example 1 using as (a) 7.6 parts of a water soluble methylolmelamine, 6.4 parts of urea, and, 2.4 parts THPC, and, as (b) 12 parts of Varsol, and using 44.7 parts of water, and suspending 12 parts of the insolubilized resin in the oil-in-water emulsion.

An aqueous solution was prepared by dissolving 7.6 parts of a water methylolmelamine, 6.4 parts of urea, 12.4 parts of THPC and 3 parts of triethanolamine and 70.6 parts of water.

Samples of cotton cloth, an 80 square print cloth, having a weight of about 4 ounces per yarn and an 8-ounce twill were padded with the above aqueous liquids to a wet pick-up of about 100 and 70%, respectively, dried for about 4.5 minutes at 90° C. and heated for about 5 minutes at 140° C. to thermally insolubilize the further polymerizable resin.

A comparison of the properties of the treated cloths are summarized in the following table. The samples which were treated with the solution are designated as "print-solution" and "twill-solution" and the samples which were treated with the emulsion-suspension are designated as "print-emulsion" and "twill-emulsion."

| Sample | Resin add-on, percent | Stiffness (in. lb.) | | Phosphorus, percent | Strip flame test, deg. | Phosphorus after 10 launderings,[1] percent | Phosphorus after 3 hr. boil,[2] percent |
|---|---|---|---|---|---|---|---|
| | | Warp | Filling | | | | |
| Print—untreated | 0.0 | $2.8 \times 10^{-4}$ | $2.2 \times 10^{-4}$ | | None | | |
| Twill—untreated | 0.0 | $32.4 \times 10^{-4}$ | $12.4 \times 10^{-4}$ | | None | | |
| Print—solution | 10.3 | $5.2 \times 10^{-4}$ | $6.2 \times 10^{-4}$ | 1.40 | 135 | 1.40 | 1.47 |
| Twill—solution | 11.4 | | $12.2 \times 10^{-4}$ | 1.04 | 105 | 1.01 | 0.96 |
| Print—emulsion | 26.7 | $4.8 \times 10^{-4}$ | $3.6 \times 10^{-4}$ | 1.88 | 170 | 1.67 | 1.96 |
| Twill—emulsion | 15.8 | $33.5 \times 10^{-4}$ | $16.8 \times 10^{-4}$ | 1.34 | 140 | 1.14 | 1.24 |

[1] Fed. Spec.–CCC–T–191b.
[2] Fabric was boiled 3 hours in a solution containing 1.0% soap chips and 0.2% sodium carbonate.

The flame resistance of the treated cloths were compared by the strip flame test. In this method a ½ inch strip of the cloth is held at one end so that it extends toward some degrees between 0 and 180 relative to a vertical azimuth. The far ends of the so held strips are ignited by contacting them with an open flame and flame is removed as the cloth is ignited. Untreated cotton cloth will propagate a flame straight down and will burn at 0 (i. e., when held to extend vertically and ignited at the top). The degrees in the above table indicate the degrees toward which the various cloths were pointed when they would not continue to support combustion after being ignited at the end. Those which would not continue to burn when pointed toward degrees between 135 and 180 where considered to exhibit relatively low combustibility.

EXAMPLE 4

*Emulsified monomeric nitrilo-methylol-phosphorus resin forming reactants with suspended powered isolubilized methylol-phosphorus resin*

An emulsion was prepared by the procedure described in Example 1 using as (a) 12 parts of THPC, 7.5 parts of a water soluble methylolmelamine and 6.0 parts of urea, as (b) 12 parts of Varsol, as (c) 2 parts of stearic acid and 2 parts of long chain alcohol sulfate (Dupanol G), and about 56 parts of water.

An insolubilized ammonia methylol-phosphorus resin was prepared by dissolving 19 parts of THPC in 19 parts of water and mixing the solution with 10 parts of concentrated ammonium hydroxide. Within about 3 minutes a substantially colorless solid resin was precipitated. The resin was water washed until washings were neutral and then dried. The dried resin had the form of a fine powder the particles of which would pass a standard 300 mesh screen after grinding in a motor.

About 10 parts of the powder was suspended in the oil-in-water emulsion to produce an emulsion-dispersion containing about 23 parts of resin forming reactants, and about 9 parts of powdered insolubilized resin per 100 parts of emulsion suspension.

An 80 by 80 cotton print cloth was padded with the emulsion-suspension to a wet pick-up of about 90%, dried at about 90° C. and heated for about 4 minutes at 150° C. After washing to remove any adhering water soluble salts and air drying, the fabric was found to contain about 25% resin. The fabric had a good hand and a strip of the fabric would not continue to support a flame at 150° angle.

EXAMPLE 5

*Emulsified monomeric nitrilo-methylol-phosphorus resin forming reactants with suspending powdered insolubilized phenolic methylol-phosphorus resin*

An aqueous emulsion was formed by the procedure described in Example 1.

An insolubilized solid phenolic methylol-phosphorus resin was prepared by: dissolving a mixture of 7.6 parts ortho-bromophenol, 8 parts of THPC, and 1 part of triethanolamine in 20 parts of water. The solution was heated to boiling and maintained at this temperature for about 12 minutes until a jell formed. The jell was broken up and heated for about 40 minutes at a temperature of about 140° C. in a forced draft oven. The resulting dry resin was ground into particles which would pass a standard 300 mesh screen.

About 7 grams of the powdered insolubilized resin was suspended in the oil-in-water emulsion to produce an emulsion-suspension containing about 23 parts of resin forming components and about 10 parts of powdered insolubilized resin per 100 parts of emulsion suspension.

An 80 by 80 cotton print cloth was padded with the emulsion-suspension, dried at 90° C. and heated for 4 minutes at 150° C. After washing to remove any adhering water soluble salts and redrying, the fabric contained about 24% resin. The fabric had a good hand and would not continue to support a flame at 150° angle.

*Example 6*

*Emulsified monomeric nitrilo-methylol-phosphorus resin forming reactants with suspended powered insolubilized allyl phosphonitrilic polyester-bromoform adduct*

An emulsion was prepared as described in Example 1 using 12.2 parts of THPC, 7.1 parts of a water soluble methylolmelamine, 6.5 parts of urea, 3.1 parts of triethanolamine, 45.6 parts of water, 1.7 parts of a long chain alcohol sulfate, 3.4 parts of oleic acid and 10.2 parts of Varsol.

10.2 parts of a bromoform adduct of the ester of allyl phosphonitrilic chloride (made by using 0.6 mole of bromoform per mole of diallyl ester of phosphonitrilic chloride according to procedure described in copending application Serial No. 467,900) was suspended in the emulsion.

A sample of 8 oz. twill cotton cloth was padded through the emulsion, dried at 180° F. then cured 6 minutes at 290° F. After washing the fabric in hot tap water containing a water softener and drying it, the fabric passed the 180° angle strip flame test. The resin impregnated fabric exhibited good hand and tear strength properties.

We claim:

1. A textile treating composition comprising an aqueous emulsion consisting essentially of an inert water-immiscible organic liquid, an emulsifying agent, enough water to form a stable oil-in-water emulsion, and water-soluble resin-forming reactants from the group consisting of (a) aminoplast resin forming reactants and (b) phosphorus-containing resin forming reactants comprising tetrakis(hydroxymethyl) phosphonium chloride and at least one organic nitrogen compound having a molecular weight less than 400, said nitrogen compound having at least one trivalent nitrogen atom and at least two radicals from the group consisting of H— and —CH$_2$OH attached to trivalent nitrogen atoms, and dispersed in said aqueous emulsion, a powdered insoluble phosphorus-containing resin from the group consisting of (1) resins produced by reacting tetrakis(hydroxymethyl) phosphonium chloride with at least one organic nitrogen compound having at least one trivalent nitrogen atom and at least two radicals from the group consisting of H— and —CH$_2$OH attached to trivalent nitrogen atoms, (2) resins produced by reacting tetrakis(hydroxymethyl) phosphonium chloride with an inorganic trivalent nitrogen-containing compound, (3) resins produced by reacting tetrakis(hydroxymethyl) phosphonium chloride with a phenolic compound capable of condensing with formaldehyde, and (4) resins produced by reacting a terminally unsaturated polymerizable alkenyl alcohol ester of a phosphonitrilic halide with a polyhalohydrocarbon containing at least two halogen atoms from the group consisting of chlorine and bromine attached to the same carbon atom, said insoluble powdered resin being present in an amount to provide in the resulting emulsion-suspension, from about 0.2 to 2.0 parts of insoluble resin per one part of resin monomer, and at least about 0.1 part of phosphorus per part of nitrogen.

2. The textile treating composition of claim 1 in which the water soluble resin forming reactants consist of methylolmelamine, urea, and tetrakis(hydroxymethyl)phosphonium chloride and the dispersed powdered insoluble resin is an insoluble polymer of tetrakis(hydroxymethyl)-phosphonium chloride and methylolmelamine.

3. The textile treating composition of claim 1 in which the water-soluble resin forming reactants consist of methylolmelamine and the dispersed powdered insoluble resin is an insoluble polymer of tetrakis(hydroxymethyl)phosphonium and methylolmelamine.

4. The textile treating composition of claim 1 in which the water-soluble resin forming reactants consist of methylolmelamine, urea, and tetrakis(hydroxymethyl)phosphonium chloride and the dispersed insoluble resin is an insoluble polymer of tetrakis(hydroxymethyl)phosphonium chloride and ammonia.

5. The textile treating composition of claim 1 in which the water-soluble resin forming reactants consist of methylolmelamine, urea, and tetrakis(hydroxymethyl)phosphonium chloride and the dispersed insoluble resin is an insoluble polymer of tetrakis(hydroxymethyl)phosphonium chloride and orthobromophenol.

6. The textile treating composition of claim 1 in which the water-soluble resin forming reactants consist of methylolmelamine, urea, and tetrakis(hydroxymethyl)phosphonium chloride and the powdered insoluble resin is an insoluble polymeric addition product of an allyl ester of phosphonitrilic chloride and bromoform.

7. A process of reducing the flammability of a textile fabric without materially increasing the stiffness of the fabric which comprises impregnating the fabric with an aqueous mixture of water soluble, phosphorus-containing resin forming reactants comprising tetrakis(hydroxymethyl) phosphonium chloride and at least one organic nitrogen compound having a molecular weight less than 400, said nitrogen compound having at least one trivalent nitrogen atom and at least two radicals from the group consisting of H— and —CH$_2$OH attached to trivalent nitrogen atoms, said aqueous mixture also having dispersed therein a powdered insoluble phosphorus-containing resin from the group consisting of (1) resins produced by reacting tetrakis(hydroxymethyl) phosphonium chloride with at least one organic nitrogen compound having at least one trivalent nitrogen atom and at least two radicals from the group consisting of H— and —CH2OH attached to trivalent nitrogen atoms, (2) resins produced by reacting tetrakis(hydroxymethyl) phosphonium chloride with an inorganic trivalent nitrogen-containing compound, (3) resins produced by reacting tetrakis(hydroxymethyl) phosphonium chloride with a phenolic compound capable of condensing with formaldehyde, and (4) resins produced by reacting a terminally unsaturated polymerizable alkenyl alcohol ester of a phosphonitrilic halide with a polyhalohydrocarbon containing at least two halogen atoms from the group consisting of chlorine and bromine attached to the same carbon atom, said insoluble powdered resin being present in an amount to provide in the mixture from about 0.2 to 2.0 parts of dispersed insoluble resin per one part of water soluble resin forming reactants and at least about 0.1 part of phosphorus per part of nitrogen, drying the fabric and then converting the resin forming reactants into an insoluble resin in situ in the fabric.

8. A process of concurrently imparting wrinkle-resistance and flame-resistance to a textile fabric which comprises impregnating the textile fabric with an aqueous mixture of water soluble resin forming reactants from the group consisting of (a) aminoplast resin forming reactants and (b) phosphorus-containing resin forming reactants comprising tetrakis (hydroxymethyl) phosphonium chloride and at least one organic nitrogen compound having a molecular weight less than 400, said nitrogen compound having at least one trivalent nitrogen atom and at least two radicals from the group consisting of H— and —CH2OH attached to trivalent nitrogen atoms, said aqueous mixture also having dispersed therein a powdered insoluble phosphorus-containing resin from the group consisting of (1) resins produced by reacting tetrakis(hydroxymethyl) phosphonium chloride with at least one organic nitrogen compound having at least one trivalent nitrogen atom and at least two radicals from the group consisting of H— and —CH2OH attached to trivalent nitrogen atoms, (2) resins produced by reacting tetrakis(hydroxymethyl) phosphonium chloride with an inorganic trivalent nitrogen-containing compound, (3) resins produced by reacting tetrakis(hydroxymethyl) phosphonium chloride with a phenolic compound capable of reacting with formaldehyde, and (4) resins produced by reacting a terminally unsaturated polymerizable alkenyl alcohol ester of a phosphonitrilic halide with a polyhalohydrocarbon containing at least two halogen atoms from the group consisting of chlorine and bromine attached to the same carbon atom, said insoluble powdered resin being present in an amount to provide in the mixture from about 0.2 to 2.0 parts of dispersed insoluble resin per one part of resin monomer and at least about 0.1 part of phosphorus per part of nitrogen, drying the textile, and converting the resin forming reactants to an insolubilized resin in situ in the textile, the amount of impregnant being such as to provide in the dried textile a resin add-on of not more than about 35%.

9. A process of producing an aqueous composition for treating textile fabrics which comprises providing a mixture comprising an inert water-immiscible organic liquid, an emulsifying agent, enough water to form a stable oil-in-water emulsion, and water-soluble resin-forming reactants from the group consisting of (a) aminoplast resin forming reactants and (b) phosphorus-containing resin-forming reactants comprising tetrakis(hydroxymethyl) phosphonium chloride and at least one organic nitrogen compound having a molecular weight less than 400, said nitrogen compound having at least one trivalent nitrogen atom and at least two radicals from the group consisting of H— and —CH2OH attached to trivalent nitrogen atoms; agitating said mixture until a stable oil-in-water emulsion is formed; and then suspending in said oil-in-water emulsion, a powdered insoluble phosphorus containing resin from the group consisting of (1) resins produced by reacting tetrakis(hydroxymethyl) phosphonium chloride with at least one organic nitrogen compound having at least one trivalent nitrogen atom and at least two radicals from the group consisting of H— and —CH2OH attached to trivalent nitrogen atoms, (2) resins produced by reacting tetrakis(hydroxymethyl) phosphonium chloride with an inorganic trivalent nitrogen-containing compound (3) resins produced by reacting tetrakis(hydroxymethyl) phosphonium chloride with a phenolic compound capable of condensing with formaldehyde, and (4) resins produced by reacting a terminally unsaturated polymerizable alkenyl alcohol ester of a phosphonitrilic halide with a polyhalohydrocarbon containing at least two halogen atoms from the group consisting of chlorine and bromine attached to the same carbon atom, said insoluble powdered resin being added in an amount to provide in the resulting composition from about 0.2 to 2.0 parts of dispersed insoluble resin per part of soluble resin monomer and at least about 0.1 part of phosphorus per part of nitrogen.

References Cited in the file of this patent

UNITED STATES PATENTS 2,642,405     Nielson                June 16, 1953